Figure 1:
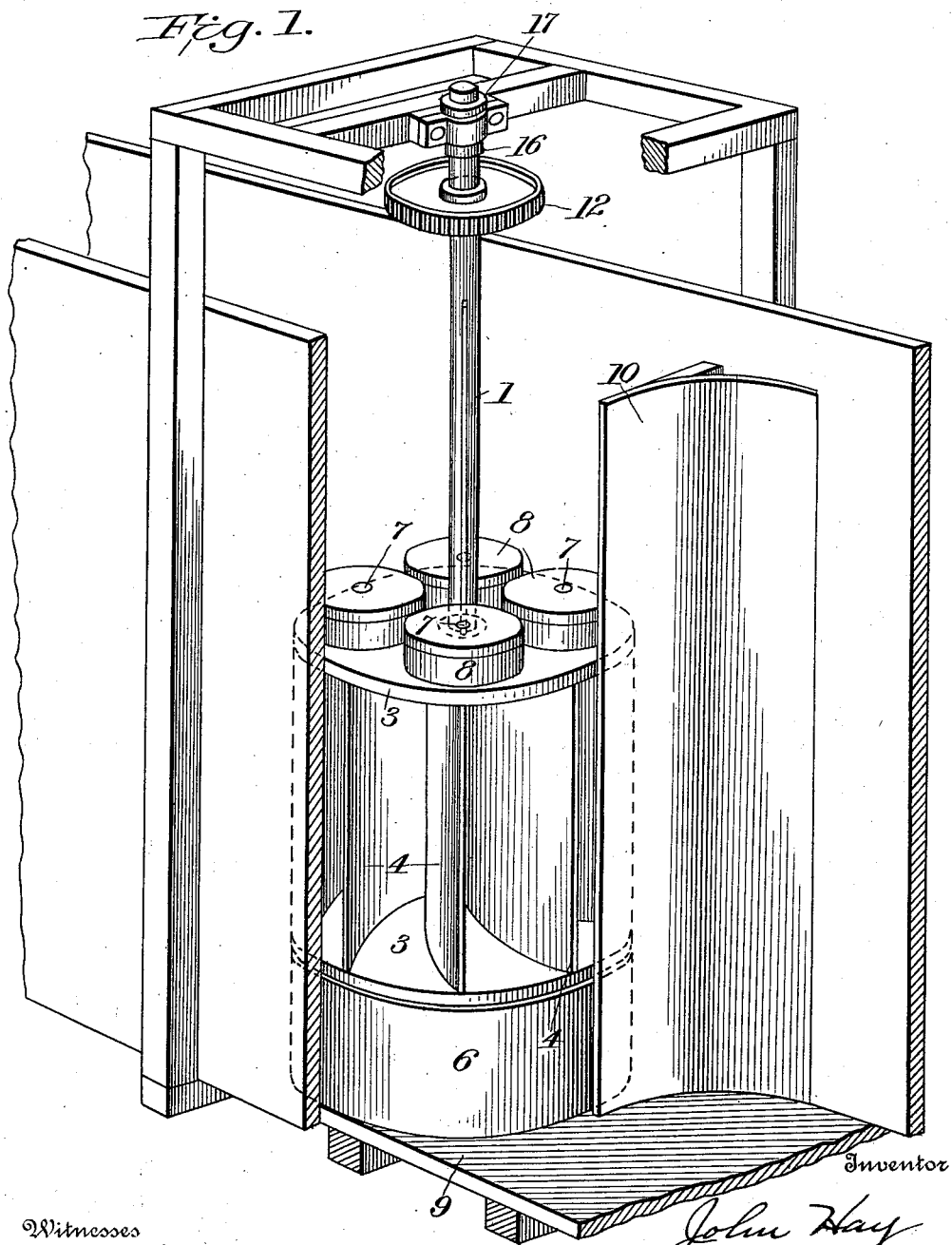

J. HAY.
TURBINE WATER WHEEL.
APPLICATION FILED DEC. 15, 1909. RENEWED AUG. 30, 1911.

1,023,378.

Patented Apr. 16, 1912.
3 SHEETS—SHEET 1.

UNITED STATES PATENT OFFICE.

JOHN HAY, OF JUNCTION CITY, KANSAS.

TURBINE WATER-WHEEL.

1,023,378.  Specification of Letters Patent.  Patented Apr. 16, 1912.

Application filed December 15, 1909, Serial No. 533,208. Renewed August 30, 1911. Serial No. 646,848.

*To all whom it may concern:*

Be it known that I, JOHN HAY, a citizen of the United States, residing at Junction City, in the county of Geary and State of Kansas, have invented certain new and useful Improvements in Turbine Water-Wheels; and I do hereby declare the following to be a full, clear, and exact description of the invention, such as will enable others skilled in the art to which it appertains to make and use the same.

My invention relates to turbine water wheels of the kind which are vertically adjustable automatically to adapt themselves to tidal changes or variation of the level of the water or stream which drives them.

One of the principal objects of the invention is to provide for supporting the wheel, as a whole, above the surface of the water when its operation is not required or when it is necessary to examine or repair any of its parts.

Another object is to provide for holding said wheel submerged at various depths whereby the force or power of the wheel may be increased or diminished.

A still further object is to secure the maximum efficiency of the wheel by reason of its arrangement in the sluiceway.

Minor objects will become apparent from the following description.

It is well known that the roughened surface of a body of water due to wind or other disturbance does not extend down very deep, that is to say, the lower strata of the water will be smooth and tranquil even though its surface is rough. With this principle in mind, I have placed a buoy beneath my water wheel so that when the latter is submerged, said buoy will be located in the smooth under strata of the water where it is undisturbed by the constant swells or surging waves of the surface waters. This arrangement of the buoy tends to steady or balance the wheel rather than causing it to rise and fall with each wave as would be the case if said buoy were arranged at the top of said wheel. The buoy, when placed below the bottom of the wheel, is also capable of supporting said wheel, as a whole, above the surface of the water which is often desirable. Removable weights are placed on top of the wheel to overcome the uplift of the buoy and hold the wheel normally submerged. The displacement of the buoy must be adjusted in accordance with the weight of the wheel when the weights are removed so that said buoys may support the wheel entirely above the surface of the water. The weights on the top of the wheel are preferably made in sections whereby the wheel may be placed at various levels in the water and the force or power exerted by the wheel thus regulated.

My invention also contemplates the mounting of the wheel in a sluiceway in such a manner that the power of the water flowing through it will be directed only on one side of said wheel and the volume and velocity of the stream on that side will be greatly increased whereby the power of the motor will be correspondingly greater.

The invention also consists in the features of construction and combinations of devices hereinafter described and specified in the claims.

Figure 2:
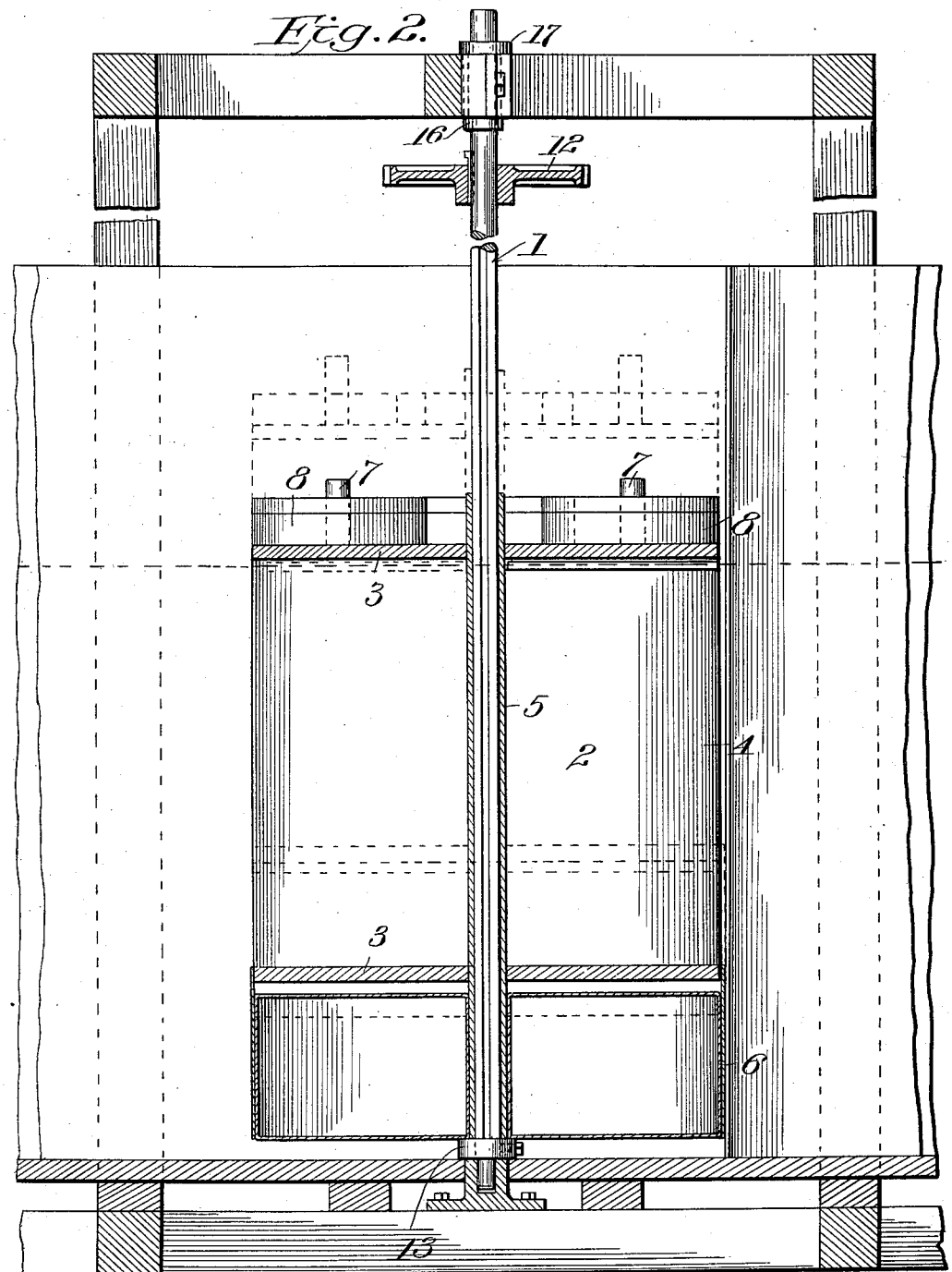
Figure 3:
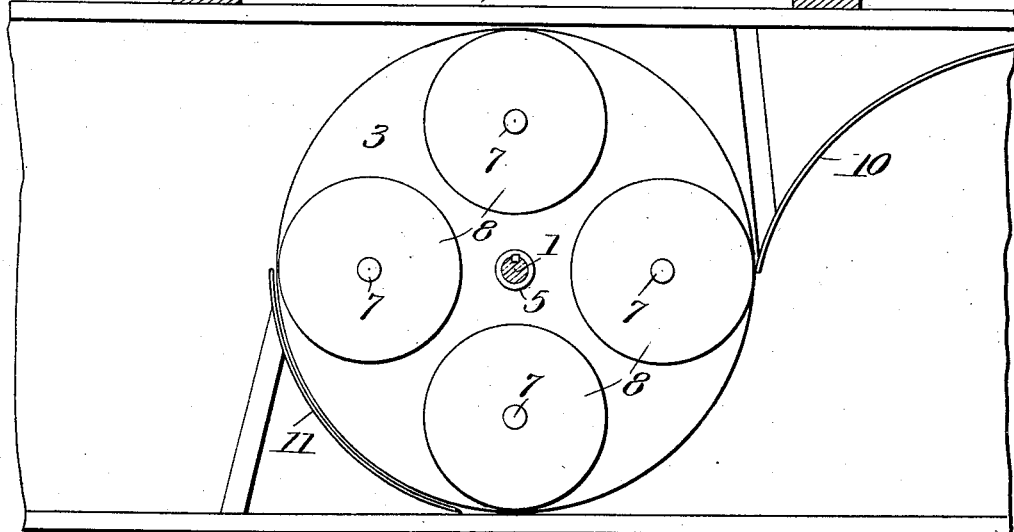
Figure 4:
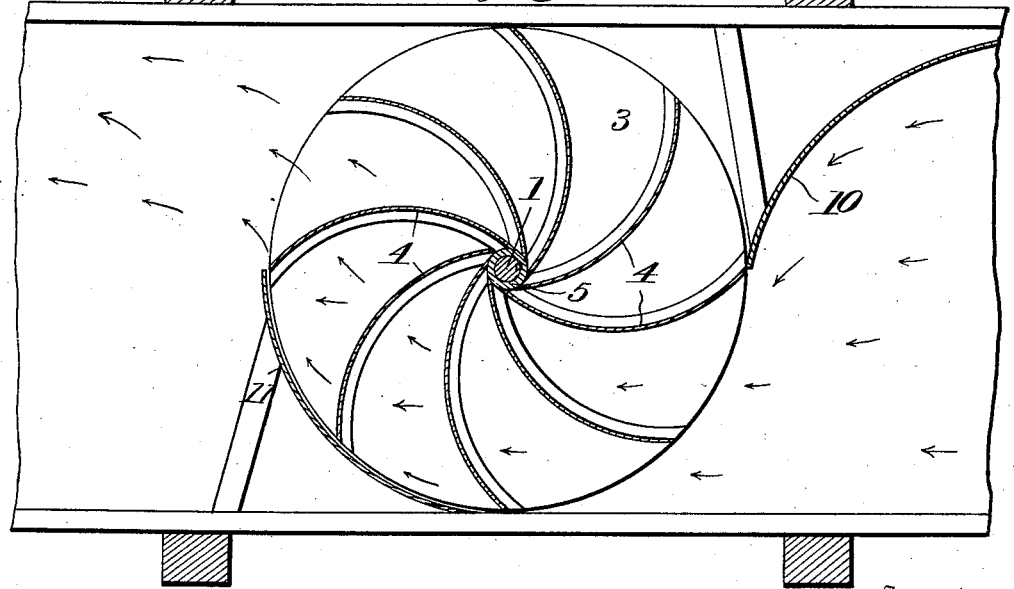

In the accompanying drawing illustrating one embodiment of my invention: Figure 1 is a perspective view of the water wheel or motor. Fig. 2 is a central vertical section of the wheel. Fig. 3 is a horizontal section taken above the wheel, and Fig. 4 is a horizontal section taken through said wheel.

Referring more particularly to the drawings, 1 designates the vertical rotary shaft on which the water wheel 2 is splined or keyed and adapted to slide up and down. Said wheel consists of upper and lower circular disks or heads 3 between which are arranged curved blades 4 which extend from the peripheries of said disks inward to a hollow shaft 5 which fits around the rotary shaft 1. A buoy 6 comprising an air tight drum, as shown, or made of any suitable buoyant material, is secured below the lower head of the wheel. The hollow shaft preferably extends down through the buoy, as illustrated in Fig. 2.

Upwardly projecting pins 7 are provided on the top disk of the wheel to receive the weights 8. These pins are preferably arranged equidistant apart and equidistant from the shaft and similar weights are placed on each of the pins whereby the wheel is evenly balanced. I have shown two weights of different thicknesses on each pin to illustrate that one of these weights may be removed to allow the wheel to rise part way out of the water with the result that the power of the wheel will be decreased.

It will be understood that the weights may be made in any and all sizes that may be useful for regulating the power of the motor. These weights not only hold the wheel down in the water the desired depth but also add momentum in the same manner as a balance wheel does to the shaft of an engine.

In the sluiceway, trough or boxing 9 in which the water wheel is arranged, there are two deflectors 10 and 11, respectively. The first deflector is placed on the inflow side of the wheel and extends from one side of the boxing inward to near the center thereof. The inner edge of this deflector terminates in juxtaposition to the periphery of the wheel. The other deflector extends from the other side of the boxing and is arranged on the other side of the wheel. Said latter deflector is curved to conform to the wheel and extends half way across the sluiceway. The first deflector is curved in the opposite direction from the second one so that it has a tendency to direct the water into the pockets between the blades of the wheel. Said blades are curved so as to successively present their convex faces to the inflow of the water until they become exposed or pass out from behind the first deflector. This arrangement causes the full force of the water to be exerted upon the positive side of the wheel so that practically none of its energy is felt on the negative side thereof. The power of the wheel is, therefore, greatly increased by reason of there being no negative force to be overcome. Because of the location of the two deflectors, as described, the water passing through the wheel remains in operative contact with each blade during more than one-half of each of its revolutions. The placing of the first deflector in the position which it occupies reduces the width of the sluiceway or flume one-half at that point, with the result that the volume of the water flowing upon the positive side of the wheel is doubled, accelerating its velocity and increasing its power a hundred per cent.

I do not limit myself to the exact details of construction shown and described herein as these may be changed without departing from the spirit or sacrificing the advantages of my invention. For instance, any other means than the gear 12 may be employed for transmitting the power from the rotary shaft and any suitable device which can be adjusted on said shaft may be substituted for the collar 13 which supports the wheel when submerged by coming in contact with the bottom of the buoy. This collar is made adjustable in order that the wheel may be set at the proper height on the rotary shaft in view of the level of the water in the sluiceway. Said shaft is mounted in suitable bearings 14 and 15 at its upper and lower ends.

It may be noted further with regard to the weights that two sets of them may be provided, if preferred, one for bringing the lift of the buoy and the specific gravity of the wheel to exact counterpoise when the wheel is above the surface of the water, and the other set for overcoming the buoyancy of the water and holding the wheel submerged.

A flanged sleeve 16 is fitted and secured to the upper end of the rotary shaft. Its flange 17 engages the top of the upper bearing and supports the weight of the wheel off of the lower bearing whereby the life of the latter is greatly increased. The sleeves may be readily removed when its flange is worn out and another one substituted.

I claim:—

1. The combination, with a vertical rotary shaft, of a water wheel splined thereon and having rigid blades arranged longitudinally of said shaft, and a buoy rigidly secured to said wheel below the lower extremities of said blades whereby the latter may be supported entirely above the surface of the water for the purpose specified.

2. The combination, with a vertical rotary shaft, of a water wheel splined thereon and having rigid blades arranged longitudinally of said shaft, and a buoy rigidly secured to said wheel below the lower extremities of said blades whereby the latter may be supported entirely above the surface of the water for the purpose specified, and means for depressing said wheel so that its blades will be submerged.

3. The combination, with a vertical rotary shaft, of a water wheel splined thereon and having rigid blades arranged longitudinally of said shaft, and a buoy rigidly secured to said wheel below the lower extremities of said blades whereby the latter may be supported entirely above the surface of the water for the purpose specified, and means for depressing said wheel to various depths for regulating the power generated by the wheel.

4. The combination, with a vertical rotary shaft, of a water wheel splined thereon and having rigid blades arranged longitudinally of said shaft, and a buoy rigidly secured to said wheel below the lower extremities of said blades whereby the latter may be supported entirely above the surface of the water for the purpose specified, and removable weights for depressing said wheels to various depths for regulating the power generated by the wheel.

5. The combination, with a rotary shaft, of a water wheel splined thereon and comprising upper and lower disks, and blades arranged between said disks, a buoy beneath the lower disk adapted to support the wheel above the surface of the water when desired, and removable weights on the upper disk for holding said wheel submerged.

6. The combination, with a rotary shaft, of a water wheel splined thereon and comprising upper and lower disks, and blades arranged between said disks, a buoy beneath the lower disk adapted to support the wheel above the surface of the water when desired, pins on the upper disks, and weights removably mounted on said pins for the purpose specified.

7. The combination, with a rotary shaft, of a water wheel splined thereon and comprising upper and lower disks, and blades arranged between said disks, a buoy beneath the lower disk adapted to support the wheel above the surface of the water when desired, pins on said upper disk arranged equidistant apart and equidistant from said tubular axle, and weights removably mounted on said pins for the purpose specified.

8. The combination, with a rotary shaft, of a water wheel splined thereon and comprising upper and lower disks, a tubular shaft and blades arranged between said disks and extending from the tubular shaft outwardly, and a buoy beneath the lower disk adapted to support the wheel above the surface of the water when desired.

9. The combination, with a rotary shaft, of a water wheel splined thereon and comprising upper and lower disks, a tubular shaft and blades arranged between said disks and extending from the tubular shaft outwardly, a buoy beneath the lower disk adapted to support the wheel above the surface of the water when desired, and removable weights on the upper disk for holding said wheel submerged.

10. The combination, with a rotary shaft, of a water wheel splined thereon and comprising upper and lower disks, a tubular shaft and blades arranged between said disks and extending from the tubular shaft outwardly, a buoy beneath the lower disk adapted to support the wheel above the surface of the water when desired, pins on the upper disks, and weights removably mounted on said pins for the purpose specified.

11. The combination, with a rotary shaft, of a water wheel splined thereon and comprising upper and lower disks, a tubular shaft and blades arranged between said disks and extending from the tubular shaft outwardly, a buoy beneath the lower disk adapted to support the wheel above the surface of the water when desired, pins on said upper disk arranged equidistant apart and equidistant from said tubular axle, and weights removably mounted on said pins for the purpose specified.

12. The combination, with a sluiceway, of a rotary shaft arranged vertically therein, a water wheel splined on said shaft, a buoy beneath said wheel for supporting the same above the surface of the water when desired, means to normally hold said wheel submerged, a deflector in the sluiceway at the inflow side of the wheel and extending throughout the range of vertical movement of said wheel, and another deflector of similar height on the other side of the wheel and sluiceway, all for the purposes specified.

In testimony whereof, I affix my signature, in presence of two witnesses.

JOHN HAY.

Witnesses:
  CHAS. H. MANLEY,
  FANNIE WINGFIELD.

---

Copies of this patent may be obtained for five cents each, by addressing the "Commissioner of Patents, Washington, D. C."